United States Patent
Fan

(10) Patent No.: US 7,793,899 B2
(45) Date of Patent: Sep. 14, 2010

(54) STRUCTURE FOR A SUCTION DEVICE

(76) Inventor: Eagle Fan, No. 133, Cheng-Kung 6 St., Chu-Pei City, Hsinchu (TW)

( * ) Notice: Subject to any disclaimer, the term of this patent is extended or adjusted under 35 U.S.C. 154(b) by 24 days.

(21) Appl. No.: 12/267,733

(22) Filed: Nov. 10, 2008

(65) Prior Publication Data

US 2010/0116954 A1 May 13, 2010

(51) Int. Cl.
*F16B 47/00* (2006.01)
(52) U.S. Cl. .............................. 248/206.2; 248/292.12; 248/309.3
(58) Field of Classification Search .............. 248/205.5, 248/205.7–205.8, 206.2–206.3, 683, 309.3, 248/362, 363, 292.12
See application file for complete search history.

(56) References Cited

U.S. PATENT DOCUMENTS

| 4,133,575 | A | * | 1/1979 | Mader | 248/205.8 |
| 4,580,751 | A | * | 4/1986 | Panzer | 248/205.8 |
| 6,045,111 | A | * | 4/2000 | Hsieh | 248/551 |
| 6,478,271 | B1 | * | 11/2002 | Mulholland | 248/205.8 |
| 7,021,593 | B1 | * | 4/2006 | Fan | 248/206.2 |
| 7,226,026 | B2 | * | 6/2007 | Lin | 248/205.5 |
| 7,458,541 | B1 | * | 12/2008 | Chang | 242/597.7 |
| 7,516,926 | B2 | * | 4/2009 | Liu | 248/205.5 |
| 7,661,638 | B2 | * | 2/2010 | Yu | 248/205.8 |
| 2009/0121102 | A1 | * | 5/2009 | Woo | 248/205.7 |

* cited by examiner

*Primary Examiner*—Amy J Sterling
*Assistant Examiner*—Tan Le
(74) *Attorney, Agent, or Firm*—Rabin & Berdo, P.C.

(57) ABSTRACT

A suction device is provided, including a suction unit, a fixing unit, a press unit and a linkage positioning unit. The fixing unit is located on top of the suction unit. The press unit is restricted between the area close to circumference of the fixing unit and the top surface of the suction unit. The linkage positioning unit is fixed to above the fixing unit and performs linked movement with the pulling element of the suction unit. When the fixing unit tilts partially by the exerted force of a hanging object, the press unit can still press tightly against the area close to the circumference of the suction unit to maintain a strong suction hold and improve the suction durability.

5 Claims, 7 Drawing Sheets

STRUCTURE FOR A SUCTION DEVICE

FIELD OF THE INVENTION

The present invention generally relates to a suction device, and more specifically to a structure for a suction device with durable suction.

BACKGROUND OF THE INVENTION

FIG. 1 shows a schematic view of a conventional suction device in use. As shown in FIG. 1, suction device 100 includes a suction disc 10, a shell 11 and a wrench unit 12. Shell 11 further includes a connecting element 111 for connecting a heavy object 15 of any kind. In this manner, heavy object 15 can be hung on a vertical surface 90 with a suction device 100. Suction device 100 uses suction disc 10 to attach to vertical surface 90. A compressible space 101 is formed between suction disc 10 and vertical surface 90. Wrench element 12 is for pulling the center of suction disc 10 away from vertical surface 90 so that compressible space 101 is enlarged to create a suction similar to the vacuum suction. In addition, when wrench element 12 moves, wrench element 12 also applies force to shell 11 tightly against the surface on the circumference of suction disc 10 to prevent air from leaking into compressible space 101. In other words, the more tightly shell 11 is pressed against suction disc 10, the more durable the suction will be.

However, in practical use, suction device 100 may suffer other external forces unaccounted for. Referring to FIG. 1, if heavy object 15 is hung on connecting element 111 of shell 11 when suction device 100 is attached to vertical surface 90, lower edge 112 of shell 11 exerts the maximum force on the right side surface wall of suction disc 10 due to the hanging arm mechanism, while upper edge 113 of shell 11 is barely in contact with suction disc 10. The distribution of the forces will affect the suction of suction disc 10. If suction disc 10 is divided into two parts with a middle horizontal line, the upper part of suction disc 10 will has a smaller contact area with vertical surface 90 than the lower part of suction disc 10. Therefore, compressible space 101 will have a cross-section of a drop shape. In this manner, after a long time pull, the contact area of the upper part of suction disc will become less and less. As lower edge 113 of shell 11 does not exert force on the side wall of the upper part of suction disc 10, the air will eventually leak into compressible space 101 through the upper part of suction disc 10, which leads to the loss of suction of suction disc 10 and disengagement from vertical surface 90. It is imperative to devise a structure for suction device to enhance the durability of the suction.

SUMMARY OF THE INVENTION

The primary object of the present invention is to provide a structure for a suction device to enhance the suction durability.

Another object of the present invention is to provide a structure for a suction device to improve the suction effect.

To achieve the above objects, the present invention provides a suction unit, a fixing unit, a press unit and a linkage positioning unit. The suction unit includes a suction disc and a pulling element. The pulling element is engaged to the central area of the top of suction disc. The fixing unit is a shell convex at the central area, located on top of the suction unit. The central area of the fixing unit further includes a channel hole. The pulling element of the suction unit extends through the channel hole to above the fixing unit. The press unit is restricted between the area close to circumference of the fixing unit and the top surface of the suction unit. The linkage positioning unit is fixed to above the fixing unit and performs linked movement with the pulling element of the suction unit. The linkage positioning unit can pull the pulling element to move upwards and latch or release the position of the pulling element after uplifted.

The main feature of the present invention is the inclusion of the press unit between the fixing unit and the suction unit. The press unit is a rigid object, and the placement is restricted, however, not glued and unmovable, to be located between the fixing unit and the suction unit. When the suction device of the present invention is in use, the press unit will be pressed by the fixing unit to tightly against the surface close to the circumference of the suction unit to prevent the air from leaking into the space between the suction unit and a contact surface. When the fixing unit is pulled by a heavy object and partially pulled away, the press unit will not disengage from the contact with the suction unit. On the contrary, the press unit will remain the original tight press because of the exerted force. In this manner, the suction and the attachment to a contact surface will be more durable and the suction effect is improved.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 2:
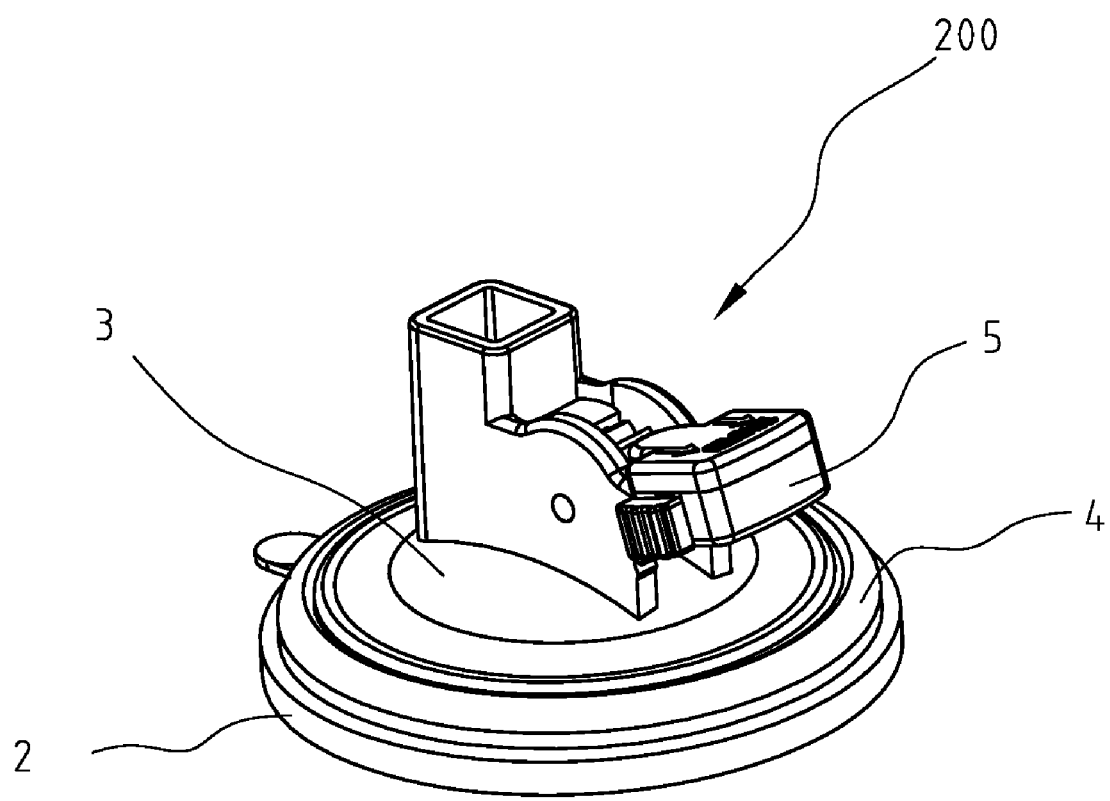
FIG. 2 shows a three-dimensional view of a first embodiment of the present invention.
Figure 3:
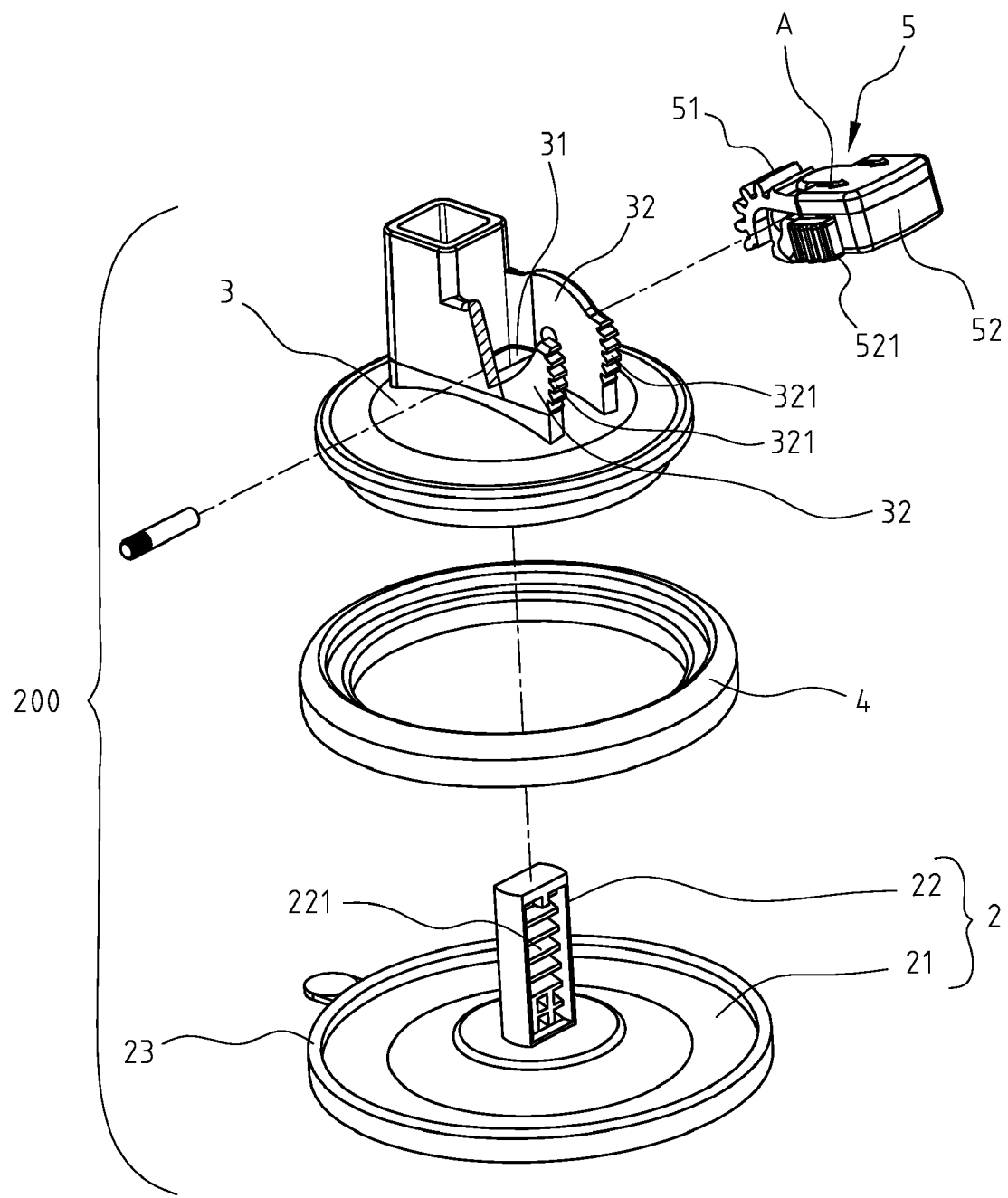
FIG. 3 shows a dissected view of a first embodiment of the present invention.

FIGS. 2 & 3 show a three-dimensional view and a dissected view of the present invention. Suction device 200 of the present invention includes a suction unit 2, a fixing unit 3, a press unit 4 and a linkage positioning 5. Suction unit 2 includes a suction disc 21 and a pulling element 22. The bottom of suction disc 21 is made of a soft material and has a shape of flat surface. Pulling element 22 is pillar-shaped, with the bottom engaged to the central area of the top of suction disc 21. Fixing unit 3 is a shell convex at the central area, located on top of suction disc 21 of suction unit 2. The central area of fixing unit 3 further includes a channel hole 31. Pulling element 22 of suction unit 2 extends through channel hole 31 to above fixing unit 3. Press unit 4 is of a ring shape made of rigid, non-deformable material. Press unit 4 is restricted between the area close to circumference of the bottom of fixing unit 3 and the top surface of suction disc 21 of suction unit 2. Linkage positioning unit 5 is fixed to the shell of fixing unit 3 and performs linked movement with pulling element 22 of suction unit 2. Linkage positioning unit 5 can pull pulling element 22 to move upwards and latch or release the position of pulling element 22 after uplifted. Because the present invention includes press unit 4, suction device 200 can be more durable and has a stronger suction hold.

Figure 1:
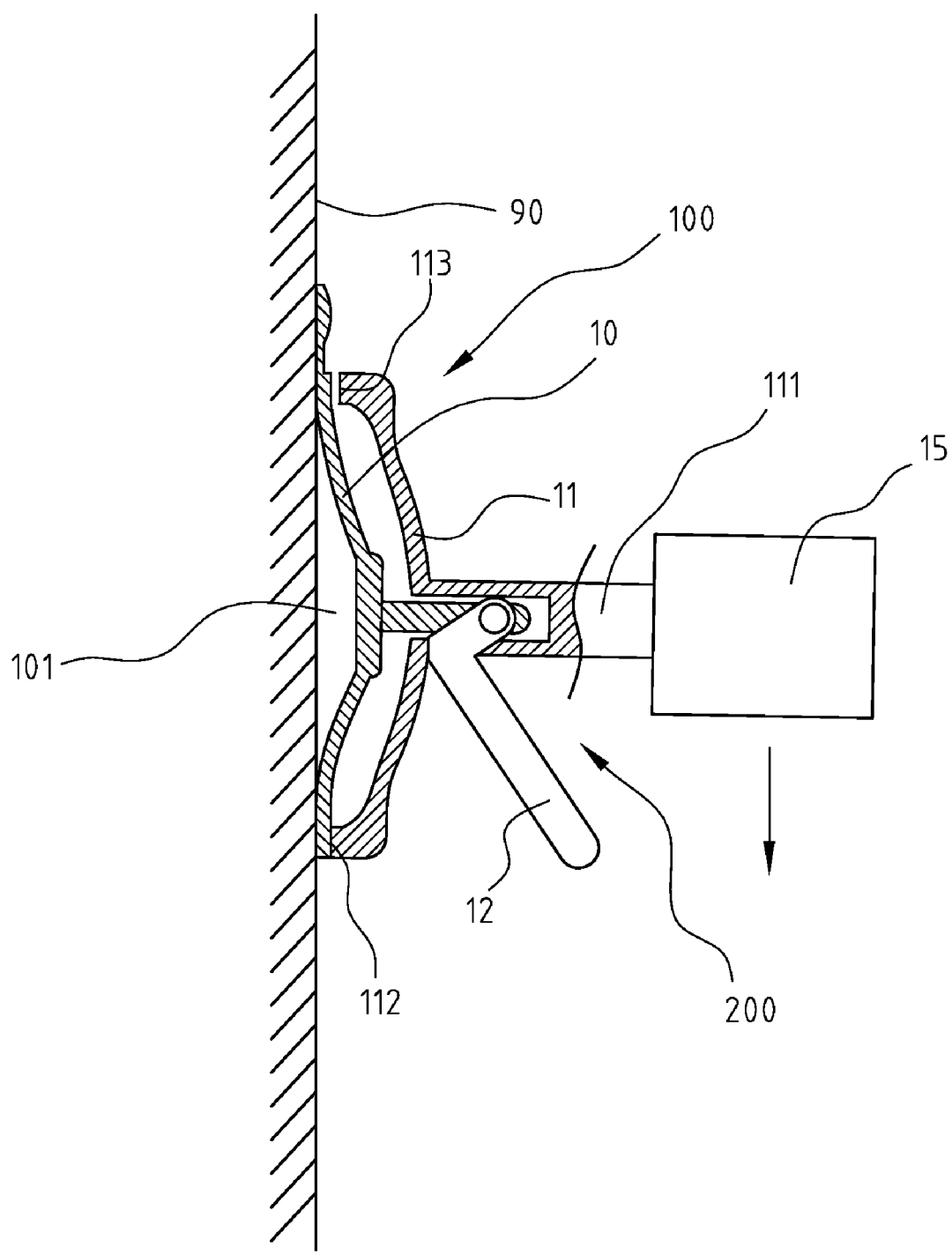
FIG. 1 shows a schematic view of a conventional suction device.

Linkage positioning unit 5 of suction device 200 is to pull pulling element 22 of suction unit 2 upward so that the central area of suction disc 21 is also pulled up to form a suction hold. Because linkage positioning unit 5 has different ways of implementations, such as the conventional structure of FIG. 1, or linkage movement by the screw, and so on, the linkage structure of the present invention is not limited to any specific form. Any linkage structure able to pull the suction disc up and latch the position can be used as the linkage positioning unit of the present invention.

Linkage positioning unit 5 is coupled to a set of racks 32. Racks 32 are located at the shell top of fixing unit 3, close to channel hole 31. The side of vertical surface of racks 32 includes positioning teeth 321. Linkage positioning unit 5 includes a contact teeth part 51 and a positioning part 52. The teeth of contact teeth part 51 form an arc, and can engage teeth rack 221 on the vertical surface of pulling element 22. Positioning part 52 has a proper internal structure to engage positioning teeth 321 on the side of racks 32 and latch to achieve the object of positioning. Positioning part 52 can either latch or release the engagement with positioning teeth 321. For example, positioning part 52 can be pushed a release button 521 along the direction of arrow A to unlatch the positioning. The linked movement of linkage positioning unit 5 is as follow. When positioning part 52 is pushed downward, contact teeth part 51 can pull pulling element 22 of suction unit 2 upward. Positioning part 52 can latch the positioning when pressed and release the positioning when release button 521 is pushed. This part is similar to the conventional linkage structure, and thus the detailed description is omitted here.

The main feature of the present invention is the inclusion of a press unit 4. Press unit 4 is a ring made of rigid material. The location of press unit 4 is restricted between the area close to the circumference of the bottom of fixing unit 3 and the top surface of suction unit 2. However, press unit 4 is not fastened to either fixing unit 3 or suction unit 2. More precisely, press unit 4 is sheathed on the circumference of the bottom of fixing unit 3. To prevent from disengagement, the minimum inner diameter of the inner hole of press unit 4 is smaller than the maximum outer diameter of the bottom of fixing unit 3. In the present embodiment, the inner hole of press unit 4 can be of a stair-step shape, and the bottom area close to the circumference of fixing unit 3 can also be of a stair-step shape to match. However, the shape is not limited to any specific type. For example, the inner hole of press unit 4 can be of a cone shape, and the bottom area close to the circumference of fixing unit 3 can also be of an upside down cone shape to match. It is worth noting that fixing unit 3 and press unit 4 are loosely coupled. When fixing unit 3 is pulled by heavy object to tilt on one side, press unit 4 will not follow. The details of this part will be described later.

Figure 4:
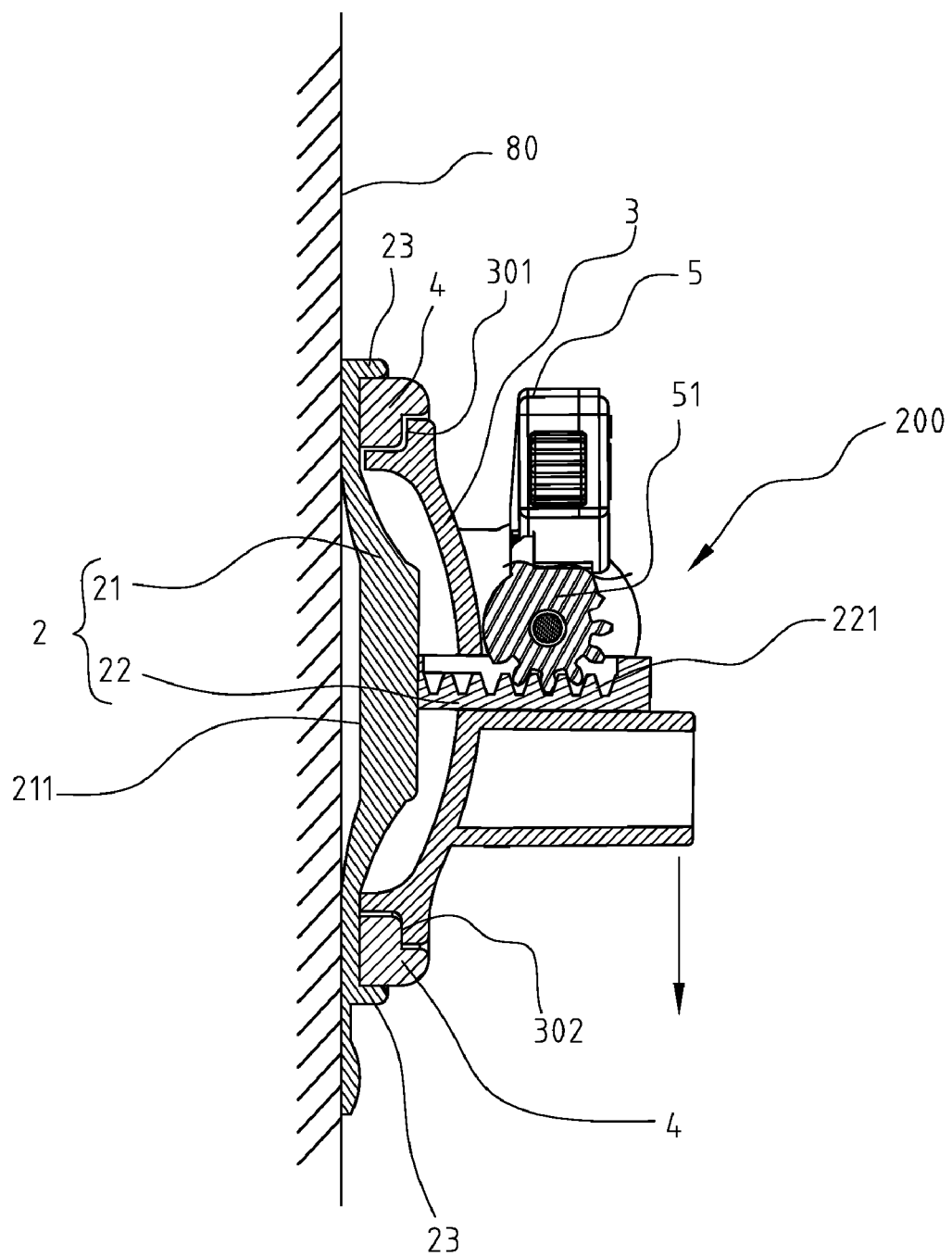
FIG. 4 shows a cross-sectional view of a first embodiment of the present invention in actual application.

FIG. 4 shows a cross-sectional view of the present invention in actual application. Suction device 200 is attached to a stationary surface 80. Linkage positioning unit 5 pulls pulling element 22 of suction unit 2 to move so that a negative pressure is formed between contact surface 211 of suction disc 21 and stationary surface 80. Fixing unit 3 presses tightly against press unit 4 so that the area close to circumference of suction disc 21 is tightly pressed against stationary surface 80 to maintain a strong suction hold. To emphasize the strong suction hold, the figure simulates the hanging of an heavy object on fixing unit 3, with the heavy object indicated by the arrow. Fixing unit 3 receives a force pulling downward, as indicated in FIG. 4, and fixing unit 3 will slightly tilt so that upper contact edge 301 is not in contact with suction disc 21 and press unit 4, while lower contact edge 302 exerts more force on press unit 4. As press unit 4 is of a rigid material, press unit 4 still presses tightly against the area close to the circumference of suction disc 21 to prevent the air from easily leaking gradually into the space between contact surface 211 and stationary surface 80. This will improve the suction durability of suction device 200.

To further enhance the suction hold of suction device 200 of the present invention, suction unit 2 can be specially designed. As shown in FIGS. 3 & 4, suction unit 2 includes a protruding ring 23. Protruding ring 23 protrudes upwards and forms around the edge of circumference of suction disc 21. When assembled, protruding ring 23 is close to the side wall of press unit 4. This is to enhance the suction hold of suction disc 21. When the central area of suction disc 21 of suction unit 2 is pulled upward, because press unit 4 blocks protruding ring 23 to prevent the border area of suction disc 21 from being pulled toward the central area, the suction hold generated at the central area of suction disc 21 is stronger.

Figure 5:
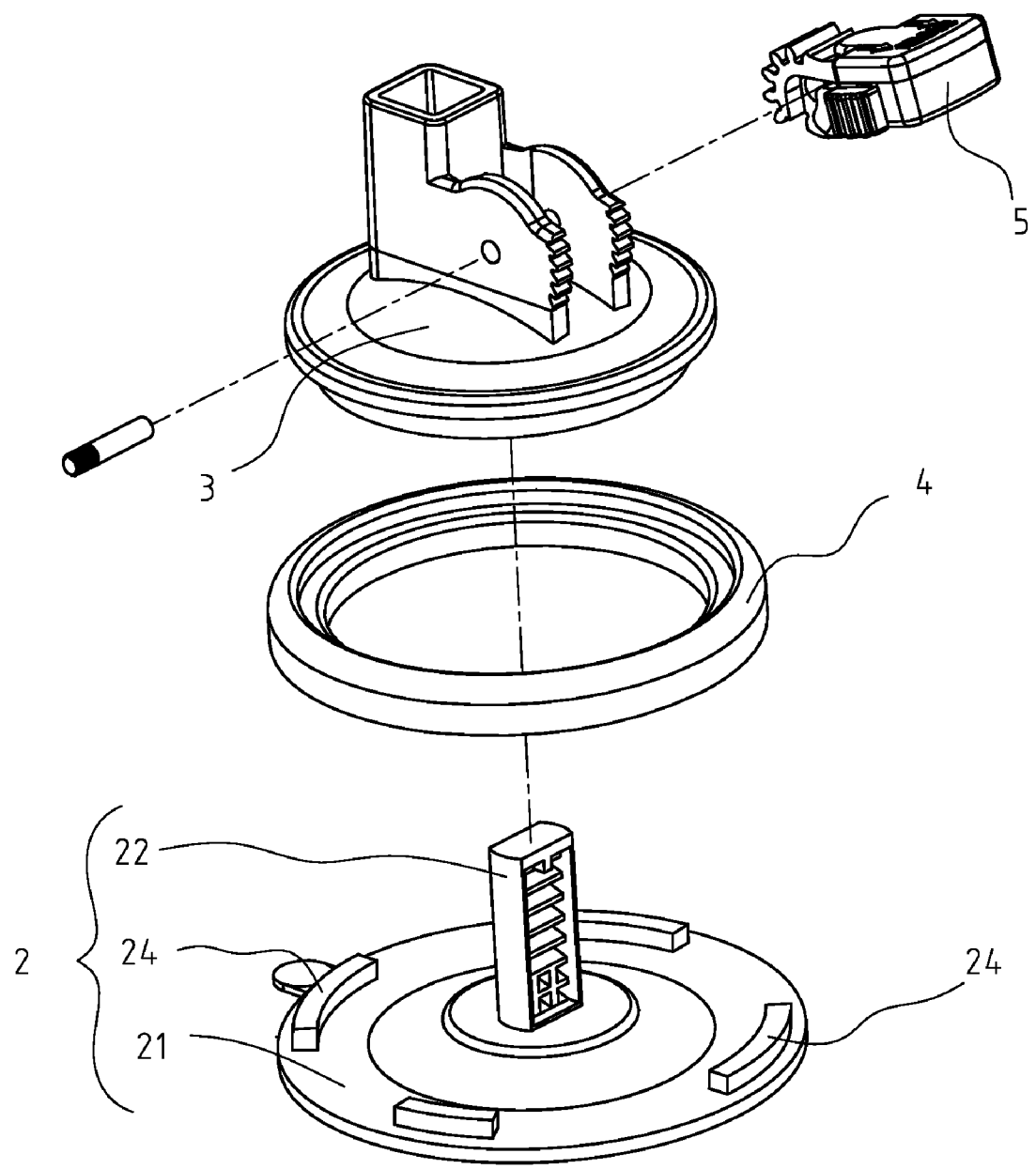
FIG. 5 shows a dissected view of a second embodiment of the present invention.
Figure 6:
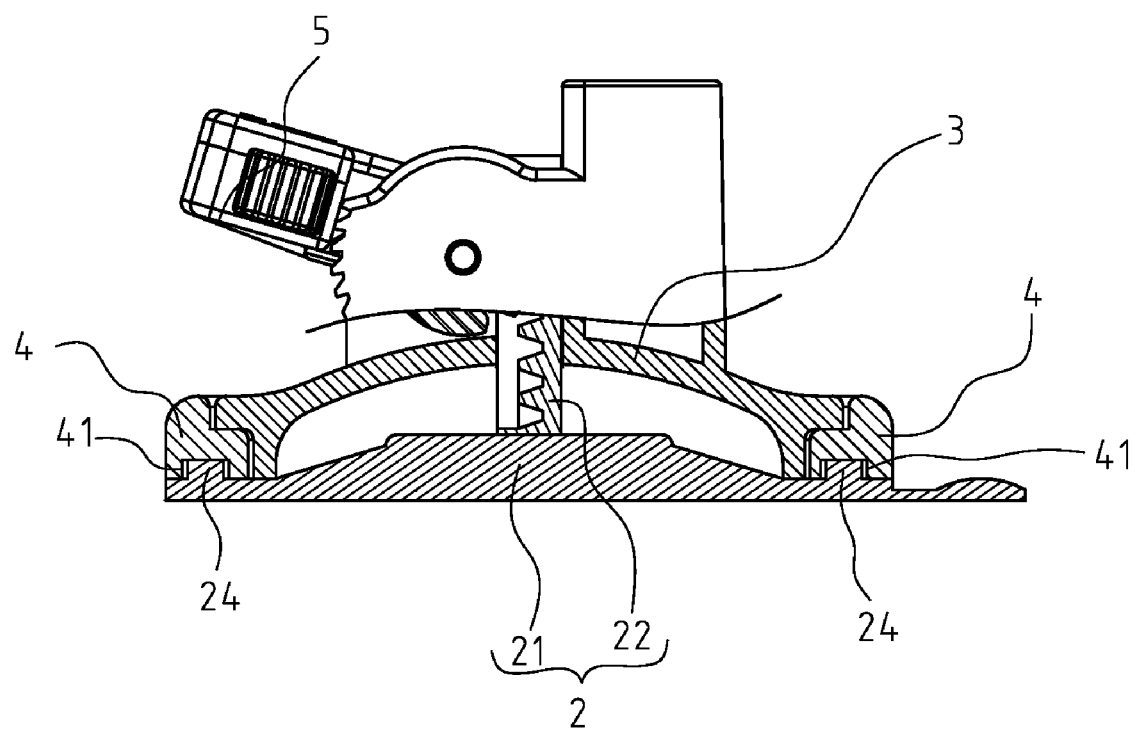
FIG. 6 shows a partial cross-sectional view of a second embodiment of the present invention.

FIGS. 5 & 6 show a dissected view and a partial cross-sectional view of the second embodiment of the present invention. In this embodiment, suction unit 2 includes a plurality of protruding blocks 24 formed on the top surface of suction disc 21, located close to the circumference. Press unit 4 further includes a plurality of housing grooves formed at the bottom of press unit 4, located correspondingly to the locations of protruding blocks 24. When assembled, protruding blocks 24 of suction unit 2 are located inside housing grooves 41 at the bottom of press unit 4. This is also to enhance the suction hold of suction disc 21.

Figure 7:
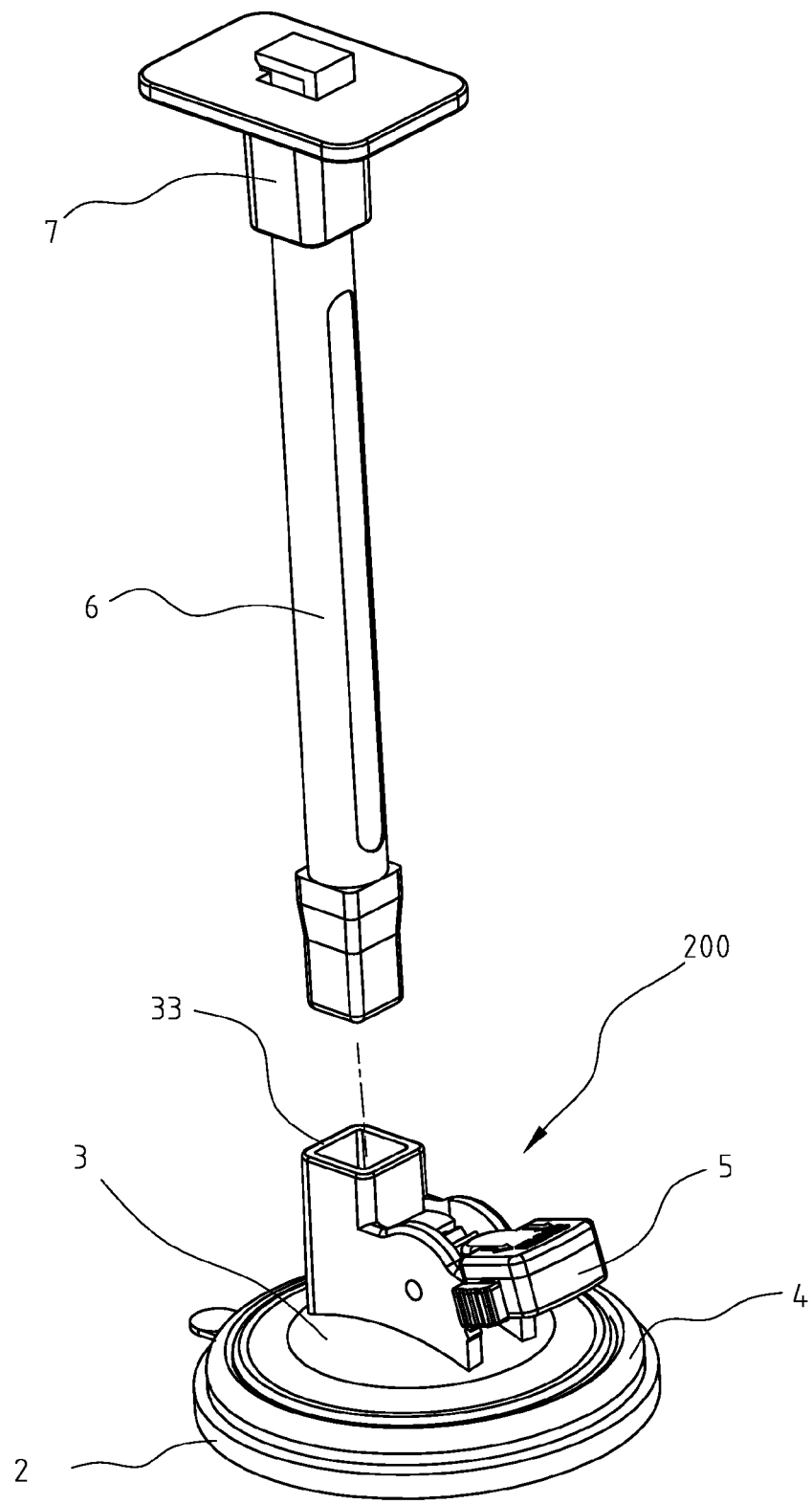
FIG. 7 shows a schematic view of the present invention in actual application.

FIG. 7 shows a schematic view of the present invention in actual application. When in actual application, suction device 200 may include other connection elements so that an object can be attached to a smooth surface with suction device 200. The application of the present invention is not limited to the embodiment thereof. As shown in FIG. 7, the top of fixing unit 3 includes a connection base 33. Connection base 33 is a slot for a bendable rod 6 to plug in. Bendable rod 6 can be made of resilient metal wrapped with plastic so as to provide sufficient strength to support while remaining bendable. Bendable rod 6 is engaged to a buckle element 7 at the tip. In this embodiment, buckle element 7 is to buckle a clapping holder (not shown) for holding electronic device, such as cell phone, PDA, and so on, for use in a car. Connection base 33 is not limited to the present embodiment, and can be designed to meet the user requirements.

In summary, the present invention uses a press unit to press the fixing unit tightly against a suction unit when the fixing unit tilts due to the force exerted by the hanging of an object so as to enhance the suction hold and improve the durability of the suction hold.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A suction device, comprising:

a suction unit comprising a suction disc and a pulling element, said pulling element being engaged to a central area of a top of said suction disc;

a fixing unit located on top of said suction unit, said fixing unit having a shell with a convex central area, and having a channel hole at a center of said shell, said pulling element of said suction unit extending through said channel hole to a top of said shell of said fixing unit, a top surface of said shell having a set of racks;

a press unit positioned between an area close to a circumference of said fixing unit and a top surface of said suction unit; and a linkage positioning unit, located at a top of said fixing unit, and forming a linked movement with said suction unit, said linkage positioning unit being adapted to pull said pulling element to move upward, and latching or releasing said pulling element from an uplifted position;

wherein when said fixing unit is partially tilted due to an exerted force caused by hanging an object, said press unit remains tightly pressed against a surface close to a circumference of said suction unit to maintain a strong suction hold; and wherein the set of racks is coupled with said linkage positioning unit to form the linked movement with said pulling element of said suction unit.

2. The suction device as claimed in claim 1, wherein a minimum diameter of an inner hole of said press unit is smaller than a maximum diameter of a bottom of said fixing unit.

3. The suction device as claimed in claim 1, wherein said press unit is a ring made of a rigid and non-deformable material.

4. The suction device as claimed in claim 1, wherein said suction unit further comprises a protruding ring formed at an area close to a circumference of said suction disc and protruding upwards.

5. The suction device as claimed in claim 1, wherein said suction unit further comprises a plurality of protruding blocks formed at the top of said suction disc and protruding upward, and said press unit further comprises a plurality of housing grooves, formed at a bottom thereof, said protruding blocks being housed inside said housing grooves.

* * * * *